United States Patent [19]

Méry

[11] Patent Number: 4,553,645
[45] Date of Patent: Nov. 19, 1985

[54] DISC BRAKE

[75] Inventor: Jean-Claude Méry, Pavillons S/Bois, France

[73] Assignee: Allied Corporation, Morristown, N.J.

[21] Appl. No.: 575,619

[22] Filed: Jan. 31, 1984

[30] Foreign Application Priority Data

Feb. 2, 1983 [FR] France ................................ 83 01621

[51] Int. Cl.⁴ ............................................ F16D 65/09
[52] U.S. Cl. ............................. 188/73.34; 188/73.39; 188/73.44
[58] Field of Search ............... 188/73.44, 73.45, 73.43, 188/73.39, 73.31–73.38, 73.1, 71.1

[56] References Cited

U.S. PATENT DOCUMENTS

| 3,942,611 | 5/1976 | Burnett | 188/73.3 |
| 4,109,266 | 8/1978 | Inoue et al. | 188/73.34 |
| 4,191,278 | 3/1980 | Karsudani | 188/73.44 X |
| 4,225,017 | 9/1980 | Op Den Camp | 188/73.44 X |
| 4,274,514 | 6/1981 | Ducharme et al. | 188/73.44 |
| 4,330,049 | 5/1982 | Cybulski et al. | 188/73.44 X |
| 4,392,560 | 7/1983 | Nakasu et al. | 188/73.34 |

FOREIGN PATENT DOCUMENTS

| 2272298 | 12/1975 | France . |
| 2290607 | 6/1976 | France . |
| 2017236 | 10/1979 | United Kingdom . |
| 2030666 | 4/1980 | United Kingdom . |

Primary Examiner—Duane A. Reger
Assistant Examiner—Michael P. Gilday
Attorney, Agent, or Firm—Ken C. Decker; Larry J. Palguta

[57] ABSTRACT

The subject of the invention is a disc brake of the type with a caliper (14) mounted so as to slide on a fixed support (2) by means of a pin (15). The caliper (14) incorporates a brake actuator acting directly on a friction pad (12) and, through the sliding caliper (14), upon the other pad (13). The pads (12, 13) are guided at least partially by transverse housings (7, 8) in the fixed support (2). According to the invention, the single pin (15) is positioned opposite the rear end portion of the inner friction pad (12), viewed in the direction of forward motion, in such a way that the orthogonal projection of the pin (15) onto the brake disc (6) is at least partially on the path of the latter, and viewed in the direction of motion slightly downstream of the corresponding guide housing (8) formed in the fixed support (2). Applicable to the braking systems of motor vehicles.

4 Claims, 4 Drawing Figures

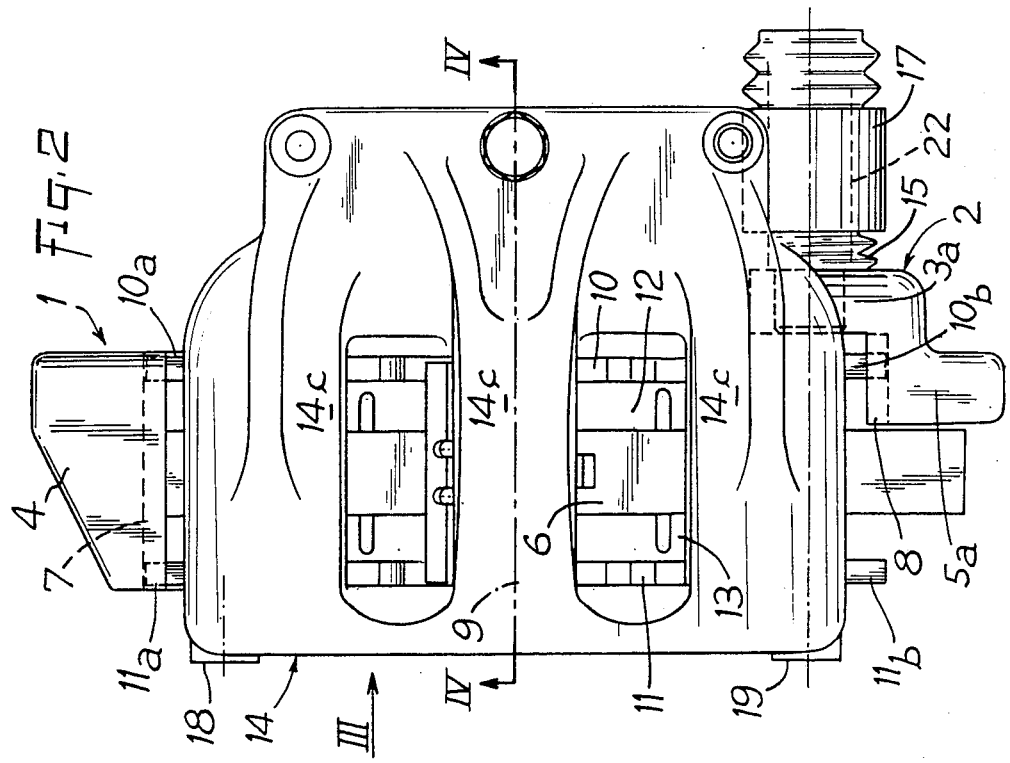
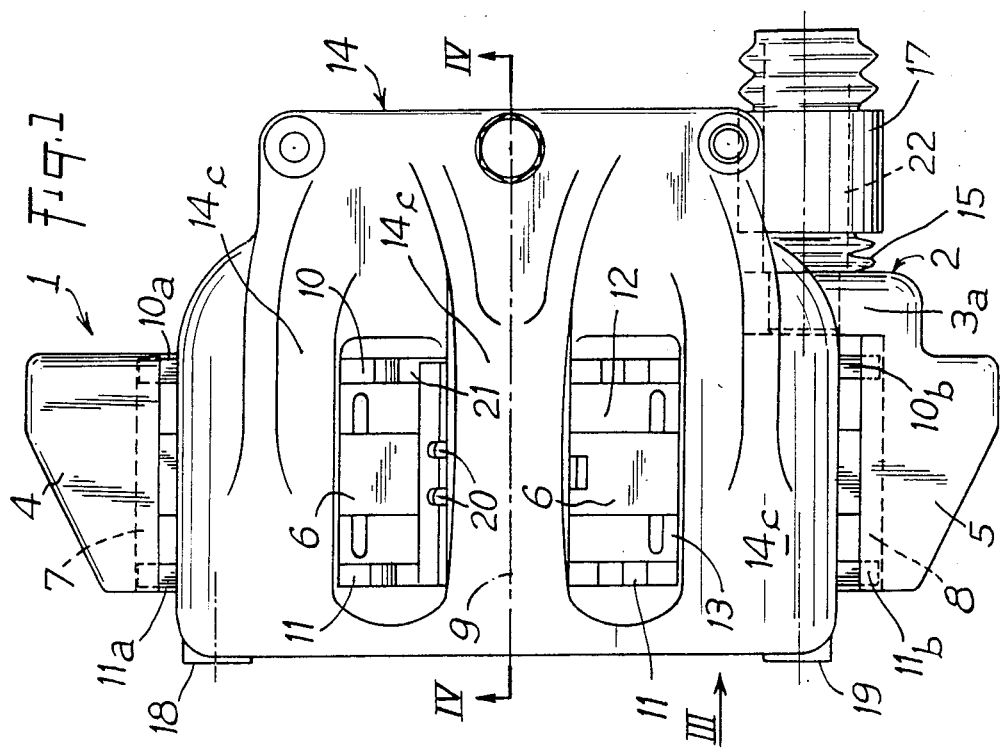

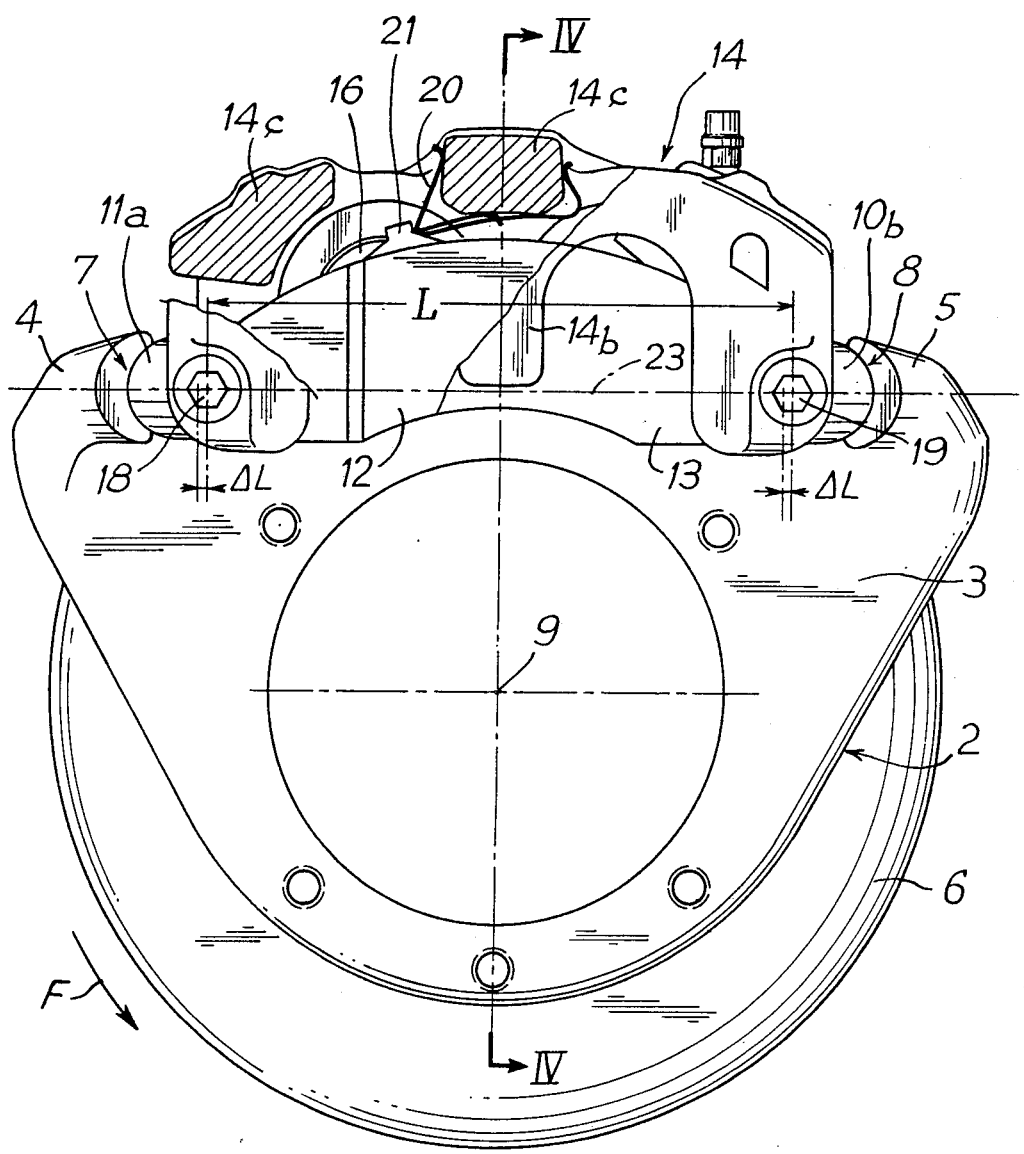

DISC BRAKE

The present invention concerns a disc brake of the type consisting of a fixed support or yoke provided with at least one lateral web and end arms having transverse guide housings, a rotating brake disc positioned beside at least one lateral web of the fixed support and covered by at least one of the end arms of the fixed support, a pair of friction pads positioned one each side of the brake disc and each provided with a lining carrier plate of which at least one end is mounted and guided in a direction parallel to the axis of the brake disc in one of the transverse guide housings, together with a caliper which, firstly, covers the friction pads and the corresponding portion of the brake disc, and secondly, by means of a single pin, is mounted on the fixed support so that it is able to move in a direction parallel to the axis of the brake disc under the action of an actuator incorporated in said caliper, this caliper also having, on the side associated with the outer pad, a locking means such as a threaded bolt, whose free end cooperates with the outer lining carrier plate so as to prevent any undesirable pivoting of the caliper.

This type of disc brake is known for example, from British Pat. No. 1,546,727. In said document, the fixed support carries the two ends of each of the two lining carrier plates and the two end arms of the fixed support extend over the path of the brake disc, the mounting of the pin being arranged in the transverse portion of the end arms. Hence, the pin is placed in a position where only a reduced space is available so that, firstly, the dimensions of the pin is reduced and secondly, its position is relatively distant from the zone of application of the friction forces. This leads to frequent distortion of the pin and defective operation of the brake, particularly skewed wear of the friction pads. These disadvantages are aggravated further when the fixed support is asymmetrical.

The aim of the present invention is to eliminate these disadvantages.

In the case of a disc brake of the type mentioned above and incorporating a fixed support or yoke, in which the two ends of the two lining carrier plates are mounted so as to slide in a direction parallel to the axis of the brake disc, this aim is achieved owing to the fact that the single pin, viewed in the direction of forward motion, is positioned opposite the rear end portion of the inner friction pad, in such a way that its orthogonal projection onto the brake disc is at least partially in the path of the latter and, taken in the direction of motion, slightly downstream of the corresponding guide housing made in the fixed support.

Owing to this design a thick rear pin may be provided (viewed in the direction of forward motion) perfectly protected and not passing over the brake disc. Thus there are no problems of bulkiness, heat, projected dirt, etc.

In the case of a disc brake of the type described initially and incorporating an asymmetrical fixed support or yoke, whose projection in plan is L-shaped and in which only the front end of the lining carrier plate of the outer pad bears on the fixed support for forward motion, this aim is also achieved owing to the fact that the single pin, viewed in the direction of forward motion, is positioned opposite the rear end portion of the inner friction pad, in such a way that its orthogonal projection onto the brake disc is at least partially on the path of the latter, and taken in the direction of forward motion, slightly downstream of the corresponding guide housing arranged in the fixed support, and that also the caliper incorporates, on the side associated with the outer pad, a removable suspension means capable of cooperating with the rear end portion of the lining carrier plate of the outer pad.

Advantageously, the caliper in this case fulfils a partial support function of the outer pad whose front end, viewed in the direction of forward motion, is transversely guided in the guide housing of the fixed support, bearing against the bottom of the said housing.

The rear suspension means can also perform the duty of a component for stopping the rotation of the caliper about the axis of the pin when said suspension means is not positioned on the axis of the said pin.

In certain cases, it is advantageous to separate the stop function from the suspension function and to assign the stop function to the front locking means and to assign the suspension function of the rear end of outer pad to the removable suspension means. For this purpose, the rear suspension means is positioned coaxially with the axis of the pin in clearance holes provided in the nose of the caliper, the inner free end of said rear suspension means being capable of entering and being fixed in a corresponding recess made in the end portion of the lining carrier plate of the outer pad.

The suspension means advantageously consists of a threaded bolt whose threaded portion screws into the tapped recess in the lining carrier plate of the outer pad.

In order to reduce the problems of accurate machining, it is advantageous to give to the clearance holes, arranged in the nose of the caliper and intended for mounting the front locking bolt and the rear suspension bolt, a certain horizontal lateral play $\Delta L$ so as to allow a slight variation of the centre-to-centre distance L between the end tapped recesses in the lining carrier plate of the outer pad and intended to accept without play the threaded ends of the locking bolt on the one hand and of the supension bolt on the other.

The subject of the invention will be better understood with the aid of the following description of two embodiments shown in the accompanying drawing in which:

FIG. 1 is a plan view of a disc brake having a symmetrical fixed support or yoke;

FIG. 2 is a plan view of a disc brake having an asymmetrical fixed support or yoke;

FIG. 3 is a partially sectioned view in elevation of the disc brake viewed along the arrow III in FIGS. 1 and 2.

Figure 4:
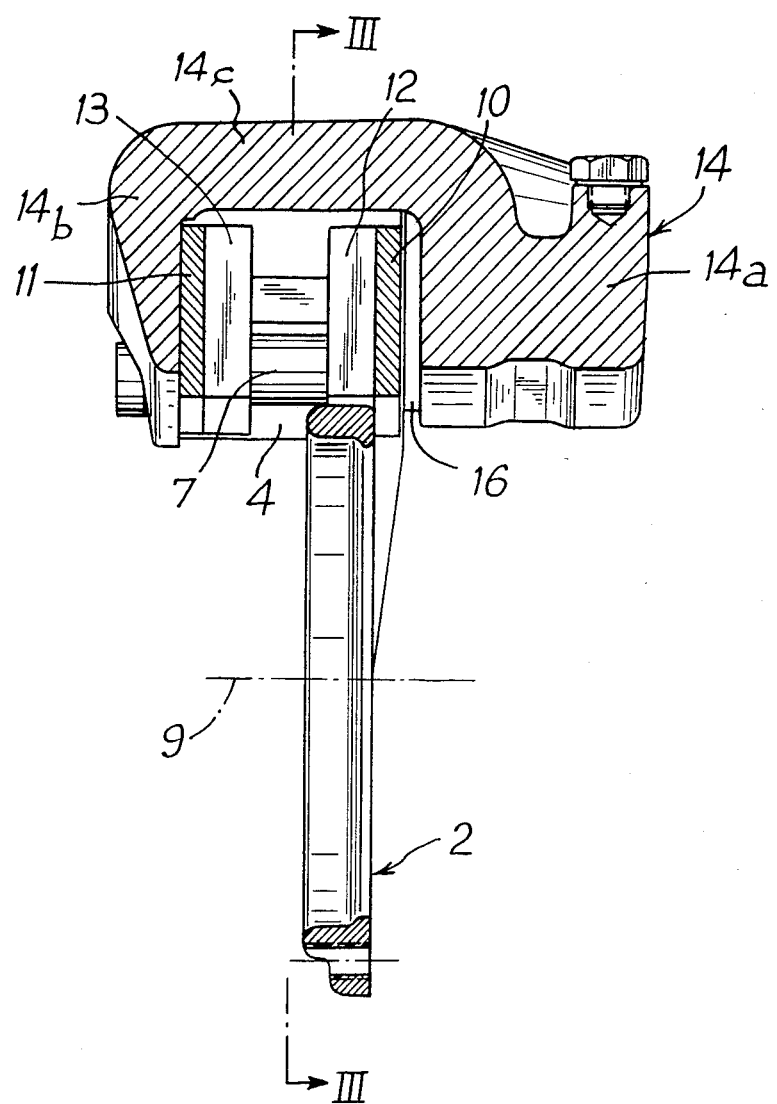
FIG. 4 is a view in elevation of a vertical radial section of the disc brake along the line IV—IV in FIGS. 1 to 3.

The disc brake 1 as shown in the drawing incorporates a fixed support or yoke 2 which, viewed in plan, may have a symmetrical shape resembling a U (FIG. 1) or an asymmetrical shape resembling an L (FIG. 2). This fixed support 2 incorporates a lateral web 3 provided, on its upper portion, with end arms 4, 5 which, in the case of a symmetrical yoke (FIG. 1), both extend over and each side of the brake disc 6 mounted so as to rotate beside the lateral web 3 of the fixed support 2 and, in the case of an asymmetrical yoke, which has a shortened rear arm 5a which extends transversly from the lateral web 3, defining the inner side of the brake 1, only as far as the inner lateral surface of the brake disc 6.

The end arms 4, 5 have, opposite the periphery of the brake disc 6, transverse guide housings 7, 8 which lie parallel to the axis 9 of the brake disc 6 and which accept the ends, preferably rounded, of the lining carrier plates 10 and 11 of the friction pads 12, 13 positioned one on each side of the brake disc. In the case of a symmetrical yoke (FIG. 1), the two ends 10a, 10b and 11a, 11b of the inner pad 12 and of the outer pad 13 are guided and supported by the guide housings 7, 8 of the fixed support or yoke 2. However, in the case of an asymmetrical yoke (FIG. 2), the rear end 11b of the lining carrier plate 11 of the outer pad 13 is not directly supported by the fixed support or yoke 2.

The disc brake 1 also incorporates a caliper 14 which covers the lining carrier plates 10, 11 with their friction pads 12, 13 together with the corresponding portion of the brake disc 6 and which, with the aid of a single pin 15, is mounted on the fixed support 2 so as to be able to move sideways parallel to the axis of the pin 15 which is parallel to the axis 9 of the annular brake disc 6 and so as to be able to pivot about the axis of said pin 15. On the inner side 14, the caliper 14 incorporates an actuator such as a cylinder 16 whose portion which is moveable with respect to the caliper 14 acts directly on the lining carrier plate 10 of the inner pad 12. The outer side 14b of the caliper 14 consists, for example, of a perforated vertical web known as a nose which serves as a transverse abutment for the lining carrier plate 11 of the outer pad 13 and which, at its upper portion, is joined to the inner side 14a of the caliper 14 by several connecting arms 14c, numbering three for example. Viewed in the direction of forward motion (see direction of rotation of the disc 6 indicated by the arrow F) the pin 15 is mounted on the rear end portion of the inner side 14a of the caliper 14, opposite an upper portion 3a of the lateral web 3; said upper portion 3a is covered by the recessed rear end portion of the caliper 14.

One end of the pin 15 can be fixed to the upper portion 3a of the lateral web 3 and the remainder of the pin 15 can slide in a guide bore 22 provided in an end lug 17 of the caliper 14. Also, the single pin 15 is positioned opposite the rear end portion of the inner friction pad 12 and practically inside the projection of the periphery of the caliper 14 parallel to the axis of the brake disc 6 or of the pin 15. In addition, the position of the pin 15 is such that the orthogonal projection of the latter onto the brake disc 6 (thus parallel to the axis of the latter) is at least partially, and preferably wholly, on the path of said disc 6 and slightly downstream of the rear guide housing 8 provided in the rear transverse end arm 5 of the fixed support 2.

Owing to the pivoting mounting of the caliper 14 on the pin 15, a locking means 18 is provided, preferably close to the front end of the caliper 14. This locking means 18 consists, for example, of a bolt whose free end is threaded, passes through a clearance hole arranged parallel to the axis 9 of the disc 6 in the front portion of the outer web 14b of the caliper and is screwed into a corresponding tapped bore in the lining carrier plate 11 of the outer pad 13. As at least the front end 11a of the outer lining carrier plate 11 is retained in its guide housing 7 against any pivoting movement, the caliper 14 is also prevented from pivoting as long as it is joined to the outer lining carrier plate 11 and, through the intermediary of the latter, to the fixed support 2.

As mentioned above, the rear end 11b of the outer lining carrier plate 11 is not directly supported by the fixed support 2 when an asymmetrical yoke is used (FIG. 2).

In this case, a removable suspension means 19 is provided, on the outer side 14b of the caliper 14, which is capable of cooperating with the rear end portion of the outer lining carrier plate 11, at a point which is positioned either ahead of the axis of the pin 15, or on the axis of the latter.

The suspension means 19 consists advantageously of a threaded bolt which passes through a corresponding clearance hole made in the rear portion of the nose 14b of the caliper 14 and which screws into a corresponding tapped bore in the outer lining carrier plate 11.

Given that the plate 11 is already retained in the front guide housing 7, it also provides the connection between the caliper 14 and the fixed support 2 when the caliper 14 is joined to this plate 11 by the rear suspension means 19.

In this case, this means 19 fulfils the function of partial support of the outer lining carrier plate 11 as well as the locking function of the caliper 14 against any pivoting movement. However, when the suspension bolt 19 is positioned in a clearance hole in the nose 14b of the caliper 14, said hole being on the axis of the pin 15, then said bolt 19 only fulfils the function of suspension of the outer lining carrier plate 11 when its threaded end is screwed into a corresponding bore in said plate 11, because the pivoting of the caliper 14 cannot be prevented by a means positioned on the axis of the pin 15. Hence it may be advantageous, firstly, to use the bolt 18 for locking the caliper 14, and secondly, to use the bolt 19 for the suspension of the outer lining carrier plate 11, this bolt 19 and its corresponding clearance hole being coaxial with the pin 15. In this case, the outer pad 13 and the suspension bolt 19 can remain in position when it is desired only to cause the caliper to pivot. It is recommended that between the internal surface of each of the two clearance holes made in the nose of the caliper 14, and the stem of the locking bolt 18 or of the suspension bolt 19, a certain horizontal lateral play $\Delta L$ be provided so that each of these two holes has an oval section and the centre-to-centre distance L between the two corresponding tapped recesses in the outer lining carrier plate 11 may vary slightly. Thus the inaccuracies of machining and assembly can be compensated, as can possible thermal expansion.

It will further be noted that the median plane of symmetry 23 of the transverse guide housings 7, 8 also preferably incorporates the axes of the clearance holes for the locking bolt 18 and the suspension bolt 19 as well as the axis of the pin 15.

In order to avoid chattering noises of the lining carrier plates 10, 11 in their corresponding front housings 7, a spring 20 is provided which is mounted, for example, on the intermediate arm 14c of the caliper and which, bearing against a lug 21 firmly fixed to the plate 10 or 11, pushes the front end 10a or 11a of the latter against the inner wall of the corresponding housing 7.

The different embodiments described above may be subjected to several modifications without thereby going outside the protection framework defined by the attached claims.

I claim:

1. Disc brake of the type consisting of a fixed support or yoke (2) provided with at least one lateral web (3) and end arms (4,5) having transverse guide housings (7,8), a rotating brake disc (6) positioned beside at least one lateral web (3) of the fixed support (2) and covered by at least one of the end arms (4,5) of the fixed support (2), a pair of friction pads (12,13) positioned on each side of the brake disc (6) and each provided with a lining carrier plate (10 or 11) of which at least one end (10a, 10b or 11a, 11b) is mounted and guided in a direction parallel to the axis (9) of the brake disc (6) in one of the transverse guide housings (7,8), together with a caliper (14) which, firstly, covers the friction pads (12,13) and the corresponding portion of the brake disc (6) and secondly, by means of a single pin (15), is mounted on the fixed support (2) so that it is able to move in a direction parallel to the axis (9) of the brake disc (6) under the action of an actuator (16) incorporated in said caliper (14), the caliper (14) also having, on the outer side (14b) associated with the outer pad (13), a locking means (18) such as a threaded bolt, whose free end connects the caliper to the outer lining carrier plate, said bolt having an axis offset from the axis of said pin so as to prevent any undersirable pivoting of the caliper (14), characterized in that the single pin (15), viewed in the direction of forward motion (F), is positioned opposite the rear end portion of the inner friction pad (12) in such a way that its orthogonal projection onto the brake disc (6) is at least partially in the path of the latter, and taken in the direction of motion, slightly downstream of the corresponding guide housing (8) made in the fixed support (2), the fixed support (2) having the shape of an L so that its rear arm (5) only extends as far as the inner surface of the brake disc (6) and that the rear end (11b) of the outer lining carrier plate (11) has no corresponding guide housing, and in that the caliper (14) incorporates on the outer side (14b), a removable suspension means having an axis (19) securing the rear end portion of the outer lining carrier plate (11) to the outer side of the caliper to secure said outer lining carrier plate thereto, the axis of said suspension means being coaxial with the axis of said pin.

2. Disc brake according to claim 1 characterized in that the removable suspension means (19) such as a threaded bolt is positioned in a clearance hole provided in the nose (14b) of the caliper (14), and whose inner free end screws into the rear end portion of the outer lining carrier plate (11) of the outer pad (13).

3. Disc brake according to claim 2, characterized in that two clearance holes, intended to accept the front locking bolt (18) and the rear suspension bolt (19), respectively, and made in the ends of the nose (14b) of the caliper (14) have a certain horizontal lateral play $\Delta L$ so as to permit a slight variation of the centre distance L between the two end tapped recesses, provided in the lining carrier plate of the outer pad, and intended to accept without play the threaded ends of, firstly, the locking bolt (18), and secondly, the suspension bolt (19).

4. Disc brake according to claim 2, characterized in that the transverse guide housings (7,8) define a median plane of symmetry therebetween, said median plane of symmetry incorporating the axes of the clearance holes for the locking bolt (18) and the suspension bolt (19) as well as the axis of the pin (15).

* * * * *

UNITED STATES PATENT AND TRADEMARK OFFICE
CERTIFICATE OF CORRECTION

PATENT NO. : 4,553,645
DATED : November 19, 1985
INVENTOR(S) : Jean-Claude Mery

It is certified that error appears in the above—identified patent and that said Letters Patent is hereby corrected as shown below:

Title.page, line [73], correct assignee to read "Societe Anonyme DBA, Paris, France.

Signed and Sealed this

Twenty-ninth Day of April 1986

[SEAL]

Attest:

DONALD J. QUIGG

Attesting Officer

Commissioner of Patents and Trademarks